United States Patent [19]

Baker et al.

[11] Patent Number: 4,573,534

[45] Date of Patent: Mar. 4, 1986

[54] CEMENT COMPOSITIONS AND METHOD OF CEMENTING CASING IN A WELL

[75] Inventors: Wilford S. Baker, Thibodaux, La.; James J. Harrison, Glenshaw, Pa.

[73] Assignee: Gulf Oil Corporation, Pittsburgh, Pa.

[21] Appl. No.: 650,071

[22] Filed: Jun. 12, 1984

Related U.S. Application Data

[63] Continuation-in-part of Ser. No. 466,550, Feb. 15, 1983, Pat. No. 4,462,836, and a continuation-in-part of Ser. No. 466,551, Feb. 15, 1983, Pat. No. 4,462,837, and a continuation-in-part of Ser. No. 518,091, Jul. 28, 1983, abandoned.

[51] Int. Cl.$^4$ ............... C04B 24/04; C04B 24/38; E21B 33/14
[52] U.S. Cl. ............................. 166/293; 106/92; 106/93
[58] Field of Search ................ 106/92, 93; 166/293

[56] References Cited

U.S. PATENT DOCUMENTS

| | | | |
|---|---|---|---|
| 2,427,683 | 9/1947 | Ludwig | 166/293 X |
| 2,580,565 | 1/1952 | Ludwig | 106/93 |
| 3,465,824 | 9/1969 | Kucera | 166/293 |
| 3,465,825 | 9/1969 | Hook et al. | 106/93 X |
| 3,483,007 | 12/1969 | Hook | 166/293 X |
| 3,959,003 | 5/1976 | Ostroot et al. | 106/93 |
| 4,089,376 | 5/1978 | Messenger | 166/293 |
| 4,258,790 | 3/1981 | Hale | 166/293 |
| 4,455,169 | 6/1984 | Chatterji et al. | 106/93 |

*Primary Examiner*—George A. Suchfield
*Attorney, Agent, or Firm*—Deane E. Keith; Forrest D. Stine; Richard D. Gaffney

[57] ABSTRACT

A novel cement composition comprising (1) cement, (2) at least one polysaccharide, and (3) a viscosity modifying amount of a 1,2-dicarbonyl; aqueous slurries prepared from these novel cement compositions and a method of cementing casing in the borehole of a well using such novel aqueous cement slurries.

75 Claims, No Drawings

CEMENT COMPOSITIONS AND METHOD OF CEMENTING CASING IN A WELL

This Application is a continuation-in-part of our Applications Ser. No. 466,550 for Cement Composition and Method of Cementing Casing in a Well, filed Feb. 15, 1983, now U.S. Pat. No. 4,462,836; Ser. No. 466,551 for Cement Composition and Method of Cementing Casing in a Well, filed Feb. 15, 1983, now U.S. Pat. No. 4,462,837; and Ser. No. 518,091 for Aqueous Cement Slurries and Method of Cementing Casing in a Well, filed July 28, 1983, now abandoned.

BACKGROUND OF THE INVENTION

1. Field of the Invention

This invention is directed to a novel cement composition for the preparation of a novel aqueous cement slurry particularly useful in cementing casing in the borehole of a well comprising (1) cement, (2) at least one polysaccharide, and (3) a defined amount of a 1,2-dicarbonyl.

2. Description of the Art

After a borehole of an oil or gas well has been drilled, casing is run into the well and is cemented in place by filling the annulus between the borehole wall and the outside of the casing with a cement slurry, which is then permitted to set. The resulting cement provides a sheath surrounding the casing that prevents, or inhibits, communication between the various formations penetrated by the well. In addition to isolating oil, gas and water-producing zones, cement also aids in (1) bonding and supporting the casing, (2) protecting the casing from corrosion, (3) preventing blowouts by quickly forming a seal, (4) protecting the casing from shock loads in drilling deeper, and (5) sealing off zones of lost circulation. The usual method of cementing a well is to pump a cement slurry downwardly through the casing, outwardly through the lower end of the casing with a shoe and/or float valve and then upwardly into the annulus surrounding the casing. The upward displacement of the cement slurry through the annulus can continue until some of the cement slurry returns to the well surface, but in any event will continue past the formations to be isolated.

If the primary cementing of the casing, as described above, does not effectively isolate the formations, it may become necessary to perforate the casing at intervals along its length and then squeeze a cement slurry under high pressure through the perforations and into the defined annulus to plug any channels that may have formed in the cement sheath. Squeezing is an expensive operation that requires bringing perforating and cementing service companies back to the well and is therefore to be avoided, if possible.

It is critical in preparing cement compositions useful in cementing casing in the borehole of a well that they be characterized by a viscosity designed for optimum mixing at varying ambient temperatures, even at, or near, freezing temperatures, flow properties sufficient to facilitate and maintain lower laminar and/or plug flow and adequate gel strength to provide thixotropic properties to the slurry when pumping ceases.

Cement slurries, using conventional polysaccharide additives, thin or become less viscous with increasing temperatures, result in turbulent flow at high displacement rates, lose their suspension properties or capabilities as they become thinner or less viscous, and have a tendency to commingle with drilling fluids. If mixed with high-density additives, separation may occur at high temperatures, and such slurries are difficult to mix at low temperatures.

Slurries of decreased viscosities may channel through drilling fluids. Turbulent flow may also erode the wall of the borehole. If suspension properties are lost, water channels can be created in the slurries that allow gas, oil or water to migrate up or down (depending on the differential pressure and direction of pressure). Commingling of cement and drilling fluid results in contamination of the cement and will result in a poor cement bond and lower compressive strengths. When a slurry is mixed under freezing conditions, the slurry density can be lower than desired and will result in lower compressive strengths and insufficient hydrostatic pressures to contain formation pressures.

SUMMARY OF THE INVENTION

We have found that the above difficulties can be obviated using the novel cement compositions defined and claimed herein, since the novel aqueous cement slurries prepared from our novel cement compositions (1) will have flow properties that will prevent or substantially inhibit turbulent flow in the annulus during displacement of the slurry, (2) will provide superior suspensions, (3) does not affect particle separation at high temperatures when slurry density is increased, and (4) can easily be mixed at low temperatures. All of these desired features are achieved because the initial viscosity at ambient conditions of the aqueous cement slurries of this invention increase with time and temperature, which means the slurries are easy to mix at ambient temperatures on the surface but increase in viscosity which is desirable under downhole conditions where the temperature gradient increases.

The novel cement compositions which will provide the above desirable characteristics comprise (1) a cement selected from Class A through Class H, (2) at least one polysaccharide, and (3) a 1,2-dicarbonyl wherein the amount of said 1,2-dicarbonyl is sufficient to obtain a viscosity of an aqueous slurry prepared from the above components at 140° F. and atmospheric pressure which is greater than the viscosity of such slurry at 70° F. and atmospheric pressure.

The cement, or first, component of the novel cement composition suitable for preparing the novel aqueous slurry can be any of the cements defined as Classes "A" through "H" in API, Spec. 10, First Edition, page 6, or in ASTM C150. Preferably the cement is that defined by the API Class "H."

The second necessary component of the novel cement compositions claimed herein is a polysaccharide or mixtures of polysaccharides. A polysaccharide is a polymer made up of repeating units of monosaccharides. The latter are the simplest members of the carbohydrate family and can be defined by the formula $C_nH_{2n}O_n$, wherein n is equal to or greater than 4, with n preferably being below 10. These polysaccharides can have molecular weights in the range of about 10,000 to about 10,000,000, but generally will be in the range of about 100,000 to about 3,000,000. By "polysaccharide," we mean to include unsubstituted as well as substituted derivatives thereof, examples of which include hydroxyalkyl substituents, such as hydroxyethyl, hydroxypropyl and hydroxybutyl, carboxymethyl, cyanoethyl, etc. Examples of polysaccharides that can be employed herein include cellulose, guar gum, starch, alginates, cargeenan, gum agar, gum arabic, gum ghatti, gum karaya, gum tragacanth, locust bean gum, pectins, tamarind gum and xanthan gum. In addition, derivatives, such as hydroxyethylcellulose ether, hydroxypropylcellulose ether, carboxymethylhydroxyethylcellulose ether, carboxymethylcellulose ether, hydroxypropylguar, hydroxypropylstarch, hydroxyethylstarch, cyanoethylguar, cyanoethylcellulose, etc., can be used. Of these, we prefer to use hydroxyethylcellulose ether, hydroxypropylcellulose ether, xanthan gum and carboxymethylhydroxyethylcellulose ether.

The third necessary component is a 1,2-dicarbonyl, which compound can preferably be defined by the following formula:

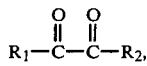

wherein $R_1$ and $R_2$, the same or different, are members selected from the group consisting of hydrogen, alkyl radicals having from one to eight, preferably from one to four, carbon atoms; aryl radicals having from six to 20, preferably from six to 10, carbon atoms; alkenyl radicals having from two to 12, preferably from two to four, carbon atoms; cycloalkyl radicals having from three to 10, preferably from three to six, carbon atoms; and aralkyl and alkaryl radicals having from six to 20, preferably from six to 12, carbon atoms. Specific examples include glyoxal ($R_1=R_2=H$), biacetyl ($R_1=R_2=CH_3$) and benzil ($R_1=R_2=$phenyl).

The 1,2-dicarbonyl has been found to be a viscosity modifying agent. The amount of the 1,2-dicarbonyl to employ (i.e., to be added) should, as noted above, be sufficient so that the viscosity of the polysaccharide-cement slurry (plus any additional components such as a dispersant and a salt) at 140° F. and atmospheric pressure is greater than the viscosity of the same slurry at 70° F. and atmospheric pressure. Such an amount can easily be determined by those having ordinary skill in the art. By inverse rheology is meant that the cement slurry will exhibit a viscosity at 140° F. and atmospheric pressure which is greater than the viscosity of the same cement slurry at 70° F. and atmospheric pressure. Preferably the viscosity increase at 140° F. is at least 10 percent greater than the corresponding viscosity at 70° F. and the viscosity increase can be significantly greater, such as a viscosity increase of 50 to 200 percent or 50 to 500 percent or more. For example, if the viscosity of a cement slurry at 70° F. and atmospheric pressure is 50 cp., inverse rheology is achieved when the viscosity of the same slurry at 140° F. and atmospheric pressure is greater than 50 cp.

Usually the amount of the 1,2-dicarbonyl to add is in the range of 0.15 to 1.0 weight percent based on the weight of cement and more usually the amount is from 0.2 to 0.8 weight percent based on the weight of cement.

The 1,2-dicarbonyl can be added to the cement compositions of this invention in any suitable way. For example, glyoxal, the preferred 1,2-dicarbonyl, is available commercially as a 40 percent aqueous solution and thus the glyoxal is most easily and thus preferably added to the water used to prepare the aqueous slurries of this invention. The glyoxal is also available in a solid trimer form and this solid can be admixed with the dry cement and/or dry polysaccharide(s).

Optionally and preferably, the compositions of this invention contain at least one salt. By "salt," we intend to include organic as well as inorganic salts. Particularly effective are inorganic monovalent and polyvalent metal salts, such as magnesium chloride, ammonium chloride, potassium chloride, sodium chloride, and calcium chloride. Of these we prefer potassium chloride.

Optionally, a dispersant is also present to improve flowability and assist the water in wetting the cement particles. By "dispersant" we mean to include any anionic surfactant, that is, any compound which contains a hydrophobic (for example, any hydrocarbon substituent, such as alkyl, aryl or alkaryl group) portion and a hydrophilic (for example, any negatively charged moiety, such as $O^-$, $CO_2^-$ or $SO_3^-$) portion. We prefer to use sulfonic acid derivatives of aromatic or aliphatic hydrocarbons, such as naphthalene sulfonic acid formaldehyde condensation product derivatives, particulary their sodium or potassium salts. Examples of dispersants that can be used include lignosulfonates; CFR-2, a sulfonate dispersant sold by the Haliburton Company; sodium naphthalene sulfonate formaldehyde condensation products, such as DAXAD 19 of W. R. Grace Company; Lomar D. of Diamond Shamrock Company, D 31 of B. J. Hughes Company, and D 65 of Dowell Company; and potassium naphthalene sulfonate formaldehyde condensation products, such as DAXAD 11 KLS of W. R. Grace Company.

Other additives conventionally added to cement compositions useful in cementing casings in the borehole of a well can also be added to the novel cement composition herein in the amounts normally used. These additives can include, for example, (1) heavyweight additives, such as hematite, ilmenite, silica flour and sand; (2) cement retarders, such as lignins and lignosulfonates; and (3) additives for controlling lost circulation, such as walnut hulls and cellophane flakes.

The novel cement compositions defined above are then employed to prepare novel aqueous cement slurries and these cement slurries can be prepared in any suitable or conventional manner. For example, the slurry can be prepared by initially mixing the dry ingredients before the addition of water or the individual components can be added to an aqueous slurry of cement. Usually, and preferably, the 1,2-dicarbonyl, which is glyoxal, is added, as noted above, as a 40 percent aqueous solution. The aqueous solution of glyoxal can suitably be added to the water which is used to make the cement slurry on-site. In yet another method, the polysaccharide(s) plus dispersant, optional but preferred as noted above, can be mixed with water to form a first aqueous solution. The 1,2-dicarbonyl can then suitably be added to the first aqueous solution with, if needed, an adjustment in pH to maintain the components in solution. Any remaining mix water can be added to the solution, which is then used to prepare the slurry of the cement and any additional components, such as a salt, as also noted above.

It is also suitable to admix the polysaccharide(s), salt(s), and cement and admix with water containing the 1,2-dicarbonyl (i.e., glyoxal) to form the desired slurry.

Table I below defines the amounts of each of the components that can be used to prepare the novel aqueous cement slurries claimed herein, based on the weight of the dry cement.

TABLE I

| | Weight Percent | |
|---|---|---|
| | Broad Range | Preferred Range |
| Polysaccharide | 0.001–3.0 | 0.01–2.0 |

TABLE I-continued

| | Weight Percent | |
|---|---|---|
| | Broad Range | Preferred Range |
| Salts* | 0.0–7 | 0.5–5 |
| Water | 30–65 | 33–60 |
| 1,2-dicarbonyl | 0.15–1.0 | 0.2–0.8 |
| Dispersant | 0.0–3 | 0.1–2 |

*Based on the weight of water

A method of cementing casing in the borehole of a well herein can comprise suspending the casing in the borehole of a well, whether vertical or slanted, pumping into the well the novel aqueous cement slurry herein until said slurry fills that portion of the space desired to be sealed and then maintaining said slurry in place until the cement sets. In a preferred embodiment the novel cement slurry herein can be pumped downwardly into the casing that has been suspended in the borehole of a well, and then circulated upwardly into the annulus surrounding the casing. Circulation can continue until the slurry fills that portion of the annular space desired to be sealed and can continue until the cement slurry returns to the surface. The cement slurry is then maintained in place until the cement sets. The cement so produced will result in a strong, continuous, unbroken bond with the outside surface of the casing and with the wall of the formation.

DESCRIPTION OF PREFERRED EMBODIMENTS

A number of cement slurries were prepared and tested. These runs are summarized on Table II below. In each of the examples in Table II, the cement employed was a Class H cement; the dispersant was DAXAD 19 (which is defined above); and the glyoxal in all examples was a 40 percent aqueous solution of glyoxal, except in Example 8 where a solid trimer of glyoxal was employed. In addition, in all of the examples in Table II the amount of cement employed was 500 grams. The cement slurries were prepared in accordance with Page 16 of API Spec. 10, First Edition, January 1982. The API viscosity was determined using the atmospheric pressure method described in Appendix H (Page 77) to API Spec. 10, First Edition, January 1982, except that the slurry was transferred to the sample cup for ambient temperature (70° F.) readings immediately after mixing. In addition, downhole readings were obtained after heating the sample cup with stirring on a water bath at atmospheric pressure to 140° F. (usually 8 to 10 minutes required). In Examples 1 and 2, the hydroxypropylcellulose ether (HPC) was sold by Hercules Company as Klucel H. In Examples 3 and 4, the carboxymethylhydroxyethylcellulose ether (CMHEC) was sold by Hercules Company as CMHEC 37L. The same CMHEC was also included in the runs for Examples 9 through 12. The hydroxyethylcellulose ether (HEC) used in Examples 5, 6, 7 and 8 was obtained from Hercules and was labeled Natrosol 250 MR and was found to contain about 0.6 weight percent of glyoxal by weight of the polysaccharide. In Examples 9, 10, 11, and 12, the HEC was again obtained from Hercules and was labeled Natrosol 250 MBR and also contained about 0.6 weight percent of glyoxal. In Examples 9 and through 12, the xanthan gum was obtained from the Kelco Company and was labeled Kelzan XCD and is believed to carry some glyoxal coating.

TABLE II

| EXAMPLE NUMBER | WT % H$_2$O | HEC | XANTHAN GUM | CMHEC | HPC | DISPERSANT | KCL | GLYOXAL | TEMPERATURE °F. (°C.) | API VISCOSITY Cp. 300 R |
|---|---|---|---|---|---|---|---|---|---|---|
| 1 | 46 | 0 | 0 | 0 | 0.26 | 0 | 3 | 0 | 70 (21.1) | 113 |
| | | | | | | | | | 140 (60) | 83 |
| 2 | 46 | 0 | 0 | 0 | 0.26 | 0 | 3 | 0.4 | 70 (21.1) | 48 |
| | | | | | | | | | 140 (60) | 220 |
| 3 | 46 | 0 | 0 | 0.26 | 0 | 0 | 3 | 0 | 70 (21.1) | 49 |
| | | | | | | | | | 140 (60) | 51 |
| 4 | 46 | 0 | 0 | 0.26 | 0 | 0 | 3 | 0.4 | 70 (21.1) | 54 |
| | | | | | | | | | 140 (60) | 137 |
| 5 | 46 | 0.26$^a$ | 0 | 0 | 0 | 0 | 3 | 0 | 70 (21.1) | 167 |
| | | | | | | | | | 140 (60) | 142 |
| 6 | 46 | 0.26$^a$ | 0 | 0 | 0 | 0 | 3 | 0.4 | 70 (21.1) | 164 |
| | | | | | | | | | 140 (60) | 300+ |
| 7 | 46 | 0.26$^a$ | 0 | 0 | 0 | 0 | 0 | 0.4 | 70 (21.1) | 162 |
| | | | | | | | | | 140 (60) | 300+ |
| 8 | 46 | 0.26$^a$ | 0 | 0 | 0 | 0 | 3 | 0.4$^b$ | 70 (21.1) | 163 |
| | | | | | | | | | 140 (60) | 261 |
| 9 | 46 | 0.26$^c$ | 0.016 | 0.064 | 0 | 0.91 | 3 | 0.08 | 70 (21.1) | 131 |
| | | | | | | | | | 140 (60) | 118 |
| 10 | 46 | 0.26$^c$ | 0.016 | 0.064 | 0 | 0.91 | 3 | 0.24 | 70 (21.1) | 135 |
| | | | | | | | | | 140 (60) | 156 |
| 11 | 46 | 0.26$^c$ | 0.016 | 0.064 | 0 | 0.91 | 3 | 0.4 | 70 (21.1) | 145 |
| | | | | | | | | | 140 (60) | 199 |
| 12 | 46 | 0.26$^c$ | 0.016 | 0.064 | 0 | 0.91 | 3 | 0.8 | 70 (21.1) | 208 |
| | | | | | | | | | 140 (60) | 300+ |

$^a$N 250 MR Purchased from Hercules, Inc.
$^b$Solid Glyoxal Trimer Added to Cement and Left Overnight Before Testing
$^c$N 250 MBR Purchased from Hercules, Inc.

Referring to Table II above, Example 1 is the base run and illustrates that in the absence of the addition of glyoxal, the viscosity of the aqueous slurry at 140° F. is less, as expected, than the viscosity of the aqueous slurry at 70° F. This is normal rheology.

Example 2 on Table II illustrates the invention in that the addition of 0.4 weight percent glyoxal based on the weight of cement results in a dramatic increase in the viscosity of the resulting aqueous slurry at 140° F. compared to the viscosity at 70° F. (i.e., the viscosity increases from 48 cp. at 70° F. to 220 cp. at 140° F.), which was quite unexpected and very advantageous for cementing casing in the borehole of a well for reasons given above. The results of Examples 3 and 4 on Table II are comparable to the results in Examples 1 and 2 except a different polysaccharide was employed (i.e., carboxymethylhydroxyethylcellulose ether was employed in Examples 3 and 4 compared to the use of hydroxypropylcellulose in Examples 1 and 2).

Examples 5 and 6 again illustrate the invention using yet another polysaccharide (i.e., hydroxyethylcellulose) and again the presence of 0.4 weight percent glyoxal was necessary in order to obtain an increased viscosity with increasing downhole temperatures. Examples 9 through 12 illustrate the use of mixtures of polysaccharides plus the addition of a dispersant and Example 9 illustrates that an amount of glyoxal of 0.08 weight percent is insufficient to result in an increase in viscosity at 140° F. compared to the viscosity at 70° F. Example 9 is therefore outside the limits of our invention. Examples 10, 11 and 12 were the same as Example 9 except the amount of glyoxal was increased to 0.24; 0.4 and 0.8 weight percent respectively and in each case inverse rheology was observed with the greatest increase corresponding to the use of the larger amount of glyoxal (i.e., Example 12).

In Example 12, the sample set up while heating which illustrates that as the amount of glyoxal increases, the time frame for setting up of the cement decreases, which for deeper wells could, of course, be undesirable since a certain amount of time is required to pump the cement into position to allow it time for setting. Thus, the compositions of the subject invention containing the higher amounts of glyoxal would be most useful for the shallower depth wells.

Example 7 was identical to Example 6 in Table II except the potassium chloride was omitted from the recipe. The purpose of Example 7 was to determine if the presence of a salt is truly needed in this particular invention in order to obtain inverse rheology. The results indicate that the presence of a salt is not required.

Example 8 was also identical to Example 6 in Table II except the glyoxal employed was a solid glyoxal trimer rather than an aqueous solution of glyoxal in water. The glyoxal trimer was added to the dry cement and was allowed to sit overnight (a total of about 18 hours) and the cement was then mixed with water and the HEC with no dispersant and readings taken to determine the solubility properties of the mixture in terms of viscosity at 70° F. and 140° F. The results showed inverse rheology in that the viscosity increased from 163 to 261 cp.

Obviously, many modifications and variations of the invention, as hereinabove set forth, can be made without departing from the spirit and scope thereof, and therefore only such limitations should be imposed as are indicated in the appended claims.

We claim:

1. A cement composition for the preparation of a novel aqueous slurry useful in cementing casing in the borehole of a well comprising (1) a cement selected from Class A through H, (2) at least one polysaccharide, and (3) a 1,2-dicarbonyl wherein the amount of said 1,2-dicarbonyl is sufficient to obtain a viscosity of an aqueous slurry prepared from the composition at 140° F. and atmospheric pressure which is greater than the viscosity of such slurry at 70° F. and atmospheric pressure.

2. The cement composition of claim 1 wherein the cement is a Class H cement.

3. The cement composition of claim 1 wherein the polysaccharide is defined by the formula $C_nH_{2n}O_n$, wherein n is equal to or greater than 4.

4. The cement composition of claim 3 wherein n is below 10.

5. A composition in accordance with claim 3 which contains in addition at least one salt.

6. The cement composition of claim 5 wherein the salt component includes potassium chloride.

7. The cement composition of claim 5 wherein the salt component includes magnesium chloride.

8. The cement composition of claim 5 wherein the salt component includes ammonium chloride.

9. The cement composition of claim 5 wherein the salt component includes sodium chloride.

10. The cement composition of claim 5 wherein the salt component includes calcium chloride.

11. The cement composition of claim 1 wherein the polysaccharide has a molecular weight in the range of about 10,000 to about 10,000,000.

12. The cement composition of claim 1 wherein the polysaccharide has a molecular weight in the range of about 100,000 to about 3,000,000.

13. The cement composition of claim 1 wherein the polysaccharide component includes hydroxyethylcellulose ether.

14. The cement composition of claim 13 wherein said 1,2-dicarbonyl is glyoxal.

15. The cement composition of claim 1 wherein the polysaccharide component includes hydroxypropylcellulose ether.

16. The cement composition of claim 1 wherein the polysaccharide component includes xanthan gum.

17. The cement composition of claim 9 wherein said 1,2-dicarbonyl is glyoxal.

18. The cement composition of claim 1 wherein the polysaccharide component includes carboxymethylhydroxyethylcellulose ether.

19. The cement composition of claim 10 wherein said 1,2-dicarbonyl is glyoxal.

20. The cement composition of claim 1 wherein the polysaccharide component includes hydroxyethylcellulose ether and xanthan gum.

21. The cement composition of claim 11 wherein said 1,2-dicarbonyl is glyoxal.

22. The cement composition of claim 1 wherein the polysaccharide component includes hydroxyethylcellulose ether, xanthan gum and carboxymethylhydroxyethylcellulose ether.

23. The cement composition of claim 12 wherein said 1,2-dicarbonyl is glyoxal.

24. The cement composition of claim 1 wherein said 1,2-dicarbonyl is defined by the formula

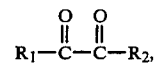

wherein $R_1$ and $R_2$ are members selected from the group consisting of hydrogen, alkyl, aryl, alkenyl, cycloalkyl, aralkyl and alkaryl.

25. The cement composition of claim 24 wherein said alkyl has from one to eight carbon atoms, said aryl has from six to 20 carbon atoms, said alkenyl has from two to 12 carbon atoms, said cycloalkyl has from three to ten carbon atoms, and said aralkyl and alkaryl have from six to 20 carbon atoms.

26. The cement composition of claim 24 wherein said alkyl has from one to four carbon atoms, said aryl has from six to ten carbon atoms, said alkenyl has from two to four carbon atoms, said cycloalkyl has from three to six carbon atoms, and said aralkyl and alkaryl have from six to 12 carbon atoms.

27. The cement composition of claim 1 wherein said 1,2-dicarbonyl is glyoxal.

28. A composition in accordance with claim 1 wherein the amount of said 1,2-dicarbonyl is from 0.15 to 1 percent based on the weight of cement.

29. The cement composition of claim 1 wherein a dispersant is also present.

30. The cement composition of claim 29 wherein said dispersant is an anionic dispersant.

31. The cement composition of claim 29 wherein said dispersant is a sulfonic acid derivative of an aromatic or aliphatic hydrocarbon.

32. The cement composition of claim 29 wherein said dispersant is a polynaphthalene sulfonate.

33. The cement composition of claim 29 wherein said dispersant is a sodium naphthalene sulfonate formaldehyde condensation product.

34. The cement composition of claim 29 wherein said dispersant is a potassium naphthalene sulfonate formaldehyde condensation product.

35. The cement composition of claim 1 wherein the amount of the 1,2-dicarbonyl is sufficient to obtain a viscosity of an aqueous slurry prepared from the composition at 140° F. and atmospheric pressure which is at least 10 percent greater than the viscosity of such slurry at 70° F. and atmospheric pressure.

36. The cement composition of claim 1 wherein the amount of the 1,2-dicarbonyl is sufficient to obtain a viscosity of an aqueous slurry prepared from the composition at 140° F. and atmospheric pressure which is from 50 percent to 200 percent greater than the viscosity of such slurry at 70° F. and atmospheric pressure.

37. A aqueous cement slurry comprising any of the compositions of claims 1 through 35 or 36, inclusive, plus water.

38. The cement composition of claim 1 wherein said compositions are present in the following weight percent based on the weight of the cement:

|  | Weight Percent |
| --- | --- |
| Polysaccharide | 0.001–3.0 |
| 1,2-dicarbonyl | 0.15–1.0 |

39. The cement composition of claim 1 wherein said components are present in the following weight percent, based on the weight of the cement:

|  | Weight Percent |
| --- | --- |
| Polysaccharide | 0.01–2.0 |
| 1,2-dicarbonyl | 0.2–0.8 |

40. A aqueous cement slurry comprising (1) a cement selected from Class A through Class H, (2) at least one polysaccharide, (3) water, and (4) a separately added 1,2-dicarbonyl and wherein said components are present in the following weight percent based on the weight of the cement:

|  | Weight Percent |
| --- | --- |
| Polysaccharide | 0.001–5.0 |
| Water | 30–65 |
| 1,2-dicarbonyl | 0.15–1.0 |

41. The aqueous cement slurry of claim 40 wherein said components are present in the following weight percent, based on the weight of the cement:

|  | Weight Percent |
| --- | --- |
| Polysaccharide | 0.01–3.0 |
| Water | 35–60 |
| 1,2-dicarbonyl | 0.2–0.8 |

42. The aqueous cement slurry of claim 41 which contains, in addition, from 0.5 to 5 weight percent of at least one salt based on the weight of water.

43. The aqueous cement slurry of claim 42 which contains, in addition, from 0.1 to 2 weight percent of a dispersant based on the weight of cement.

44. A method of cementing casing in the borehole of a well comprising suspending the casing in the borehole of a well, whether vertical or slanted, pumping an aqueous cement slurry comprising (1) a cement selected from Class A through Class H, (2) at least one polysaccharide, (3) water, and (4) a 1,2-dicarbonyl wherein the amount of said 1,2-dicarbonyl is sufficient to obtain a viscosity of such aqueous slurry at 140° F. and atmospheric pressure which is greater than the viscosity of said slurry at 70° F. and atmospheric pressure into the well until said slurry fills that portion of the space desired to be sealed and then maintaining said slurry in place until the cement sets.

45. The method of claim 44 but wherein the cement in the novel aqueous cement slurry is a Class H cement.

46. The method of claim 44 but wherein the polysaccharide in the novel aqueous cement slurry is defined by the formula $C_nH_{2n}O_n$, wherein n is equal to or greater than 4.

47. The method of claim 46 but wherein said polysaccharide n is below 10.

48. The method of claim 46 but wherein said polysaccharide has a molecular weight in the range of about 10,000 to about 10,000,000.

49. The method of claim 48 but wherein the polysaccharide has a molecular weight in the range of about 100,000 to about 3,000,000.

50. The method of claim 44 but wherein the polysaccharide component includes hydroxyethylcellulose ether.

51. The method of claim 44 but wherein the polysaccharide component includes xanthan gum.

52. The method of claim 44 but wherein the polysaccharide component includes carboxymethylhydroxyethylcellulose ether.

53. The method of claim 44 but wherein the polysaccharide component includes hydroxyethylcellulose ether and xanthan gum.

54. The method of claim 44 but wherein the polysaccharide component includes hydroxyethylcellulose ether, xanthan gum and carboxymethylhydroxyethylcellulose ether.

55. The method of claim 44 but wherein the 1,2-dicarbonyl is defined by the formula

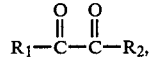

wherein $R_1$ and $R_2$ are members selected from the group consisting of hydrogen, alkyl, aryl, alkenyl, cycloalkyl, aralkyl and alkaryl.

56. The method of claim 55 but wherein said alkyl has from one to eight carbon atoms, said aryl has from six to 20 carbon atoms, said alkenyl has from two to 12 carbon atoms, said cycloalkyl has from three to ten carbon atoms, and said aralkyl and alkaryl have from six to 20 carbon atoms.

57. The method of claim 55 but wherein said alkyl has from one to four carbon atoms, said aryl has from six to ten carbon atoms, said alkenyl has from two to four carbon atoms, said cycloalkyl has from three to six carbon atoms, and said aralkyl an alkaryl have from six to 12 carbon atoms.

58. The method of claim 55 but wherein the 1,2-dicarbonyl is glyoxal.

59. The method of claim 44 but wherein the amount of said 1,2-dicarbonyl is from 0.15 to 1 weight percent based on the weight of cement.

60. The method of claim 44 but wherein the novel aqueous cement slurry contains in addition at least one salt.

61. The method of claim 60 but wherein the salt component includes potassium chloride.

62. The method of claim 60 but wherein the salt component includes magnesium chloride.

63. The method of claim 60 but wherein the salt component includes ammonium chloride.

64. The method of claim 60 but wherein the salt component includes sodium chloride.

65. The method of claim 60 but wherein the salt component includes calcium chloride.

66. The method of claim 44 but wherein said aqueous cement slurry contains, in addition, a dispersant.

67. The method of claim 66 but wherein the dispersant is an anionic dispersant.

68. The method of claim 66 but wherein the dispersant is a sulfonic acid derivative of an aromatic or aliphatic hydrocarbon.

69. The method of claim 66 but wherein the dispersant is a polynaphthalene sulfonate.

70. The method of claim 66 but wherein the dispersant is a sodium naphthalene sulfonate formaldehyde condensation product.

71. The method of claim 66 but wherein the dispersant is a potassium naphthalene sulfonate formaldehyde condensation product.

72. The method of claim 44 but wherein said components are present in the following weight percent based on the weight of the cement:

|  | Weight Percent |
| --- | --- |
| Polysaccharide | 0.001–3.0 |
| Water | 30–65 |
| 1,2-dicarbonyl | 0.15–1.0 |

73. The method of claim 44 but wherein said components are present in the following weight percent, based on the weight of the cement:

|  | Weight Percent |
| --- | --- |
| Polysaccharide | 0.01–2.0 |
| Water | 35–60 |
| 1,2-dicarbonyl | 0.2–0.8 |

74. The method of claim 73 but wherein the aqueous cement slurry contains, in addition, from 0.5 to 5 weight percent of at least one salt based on the weight of water.

75. The method of claim 73 but wherein the aqueous cement slurry contains, in addition, from 0.1 to 2 weight percent of a dispersant based on the weight of cement.

* * * * *